Aug. 9, 1932.  J. KUEN  1,871,327
AUTOMATIC VALVE SHUT-OFF
Filed Feb. 21, 1930

INVENTOR
Joseph Kuen
BY Thomas A. Jenkes Jr.
ATTORNEY

Patented Aug. 9, 1932

1,871,327

UNITED STATES PATENT OFFICE

JOSEPH KUEN, OF GLENSIDE, PENNSYLVANIA, ASSIGNOR TO BUILDERS IRON FOUNDRY, OF PROVIDENCE, RHODE ISLAND, A CORPORATION OF RHODE ISLAND

AUTOMATIC VALVE SHUT-OFF

Application filed February 21, 1930. Serial No. 430,417.

My invention relates to automatic valve shut offs, particularly adapted for closing a quantity-of-flow controller valve in a filtration apparatus while the wash water is being run through the filter bed so that on reopening the effluent valve to permit the water to again flow through the effluent line, the controller valve will not be wide open to pass the impure water through the effluent line to the clear well although it is obvious if desired that my improved automatic shut off valve may be employed in any connection for shutting off any type of hydraulically operated valve.

A further object of my invention is to employ the pressure across the closed effluent valve to actuate my improved double-acting check valve to permit closing of the controller valve.

These and such other objects of my invention as may hereinafter appear will be best understood from the description of the accompanying drawing which illustrates an embodiment thereof applied to a filtration plant.

In the drawing, Fig. 1 is a diagrammatic side elevation of an effluent line connected to a filter plant having the usual mains therein containing a differential producer and a differential responsive means to control the position of the controller valve to regulate the amount of water discharged from the filter bed with my improved double-acting check valve attached.

Figure 1:
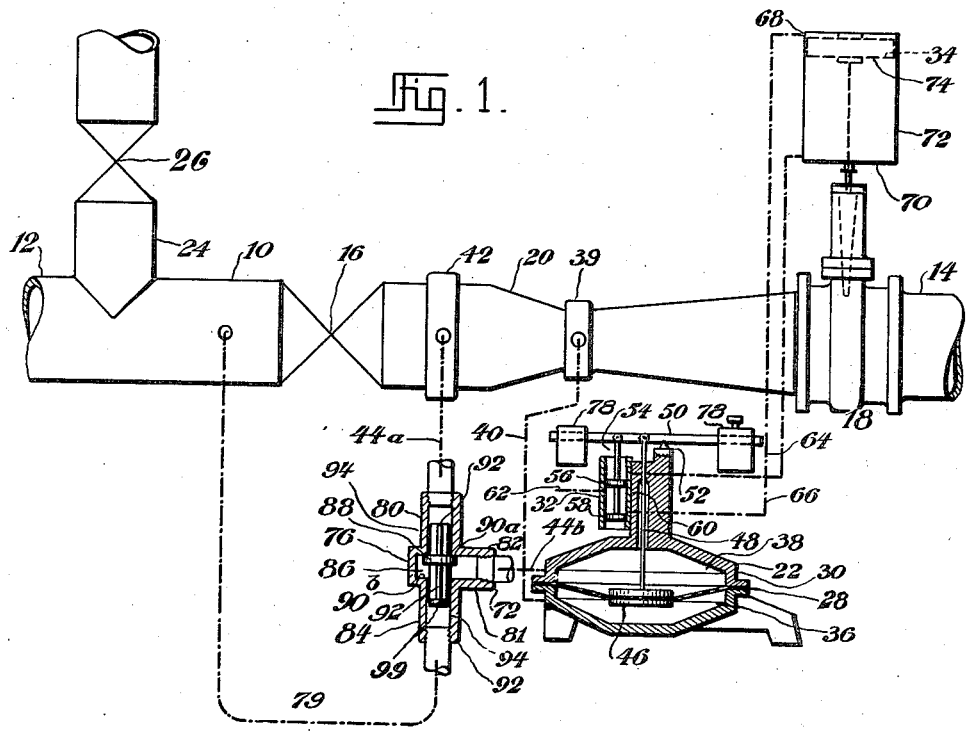
Figures 2, 3:
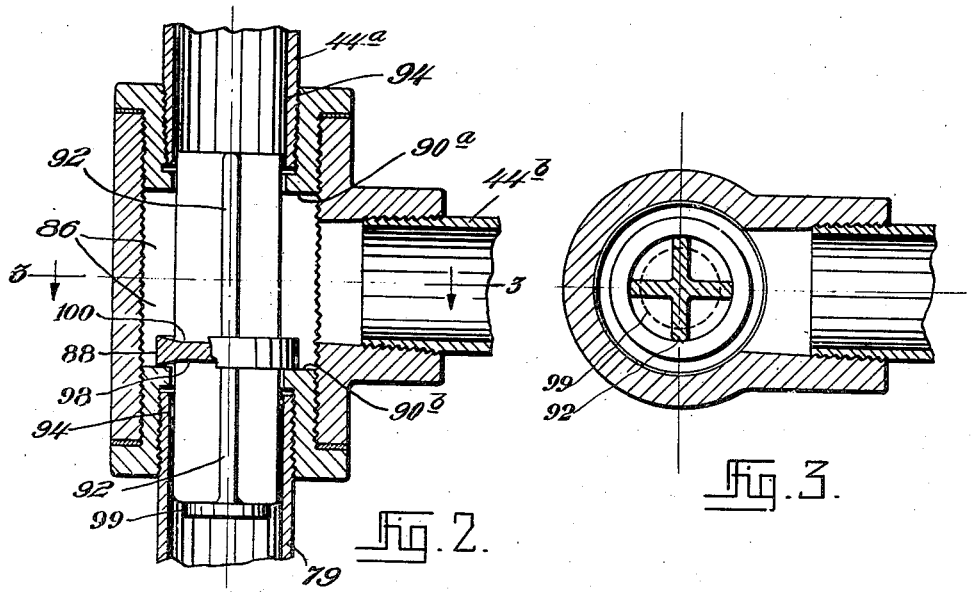
Fig. 2 is a detailed vertical sectional view of my improved double-acting check valve.
Fig. 3 is a sectional view thereof taken along the line 3—3 of Fig. 2.

In the drawing, wherein like characters of reference indicate like parts throughout, 10 generally indicates the usual effluent line from a filtration plant having the upstream end 12 thereof leading from the filter bed, and the downstream end 14 thereof discharging into the clear well. Said effluent line 10 is provided with the shut-off valve 16 therein and the controller valve 18 therein below the shut-off valve 16 for controlling the rate of flow through the effluent line 10. To regulate the position of the controller valve 18, a differential producer 20 such as the Venturi meter tube 20 shown and a differential responsive means 22 connected to said valve 18 are provided. Where my invention is employed in a filtration plant, a suitable wash-water line 24 having the valve 26 therein is connected to the effluent line 10 above said effluent valve 16.

While any suitable type of differential responsive means 22 may be employed for controlling the position of the controller valve 18, I preferably employ a diaphragm 28 enclosed within a casing 30 which controls the position of a pilot-valve 32 which in turn directly acts upon a hydraulic piston 34 which directly controls the valve 18. The diaphragm 28 divides the casing 30 into a low-pressure compartment 36 and upper high-pressure compartment 38. The low-pressure compartment 36 is connected to the effluent line 10 downstream of the differential producer; in the embodiment shown being connected to the throat 39 of the Venturi tube by the pipe 40. The upper high-pressure compartment 38 is directly connected to the upstream side of the differential producer 20 in the embodiment shown to the upstream end 42 of the Venturi meter tube by the pipe 44. The diaphragm 28 is provided with the weight 46 at the center portion thereof which is connected by the rod 48 to the balancer lever 50 fulcrumed at 52 which through the medium of the piston 54 operates the pilot valve 32. The piston 54 is provided with the two piston heads 56 and 58 respectively and the pilot valve casing 60 has the inlet line 62 connected to the center thereof and the outlet lines 64 and 66 connected respectively to the upper and lower ends 68 and 70 respectively of the hydraulic cylinder 72. The piston 74 of the hydraulic cylinder 72 directly actuates the controller valve 18. The lever 50 is suitably counterbalanced between the adjustable control weights 78 to regulate the rate of flow through the valve.

The apparatus as so far described is one common in filtration plants whether the differential responsive means 22 directly actuates the controller valve or through the medium of the hydraulic piston or other means duly controlled by the pilot valve 32. A great trouble, however, has been experienced in filtration plants, namely, when the effluent valve 16 is shut and the wash water runs through the filter bed and after washing the effluent valve 16 is opened and the wash water valve 26 shut, due to the fact that the controller valve 18 is still open, a rush of water occurs through the effluent line thereby tending to pass impure water through the effluent line into the clear well.

For the purpose of eliminating this trouble, I provide suitable means for closing the controller valve 18 when the effluent valve 16 has been closed and the wash water valve 26 opened during washing of the filter bed so that on reopening of the effluent valve 16 the controller valve 18 will not be wide open to pass inadequately filtered water therethrough, but will be closed so that the usual differential producing and responsive mechanism 20 and 22 respectively will again slowly reopen the controller valve 18 to the line 10. This permits the "floc" to form on top of the sand necessary for proper filtering.

For the above purpose, I interpose in the line 44 a weighted double-acting check valve 76 and I provide the pipe 79 joining the opposite side of said check valve 76 with the effluent line 10 above said effluent valve 16. While any suitable type of means or double-acting check valve may be employed I preferably break the pipe 44 into the portions 44$^a$ and 44$^b$ and preferably provide it with the T-joint 81 having one T-arm 80 thereof connected to the portion 44$^a$ directly connected to the upstream end 42 of said Venturi meter tube and I suitably connect the T-base 82 to the portion 44$^b$ directly connected to the high pressure compartment 38. The opposite T-arm 84 is directly connected to the pipe 79 connected to the effluent line 10 above said effluent valve 16. The center portions of said T-arms 80 and 84 are suitably enlarged as at 86 for a purpose to be described and I provide the valve head 88 free to ride back and forth in said enlarged portions 86, the opposite sides 90$^a$ and 90$^b$ of said enlarged portions 86 thus forming valve seats. In order to guide the valve head 88 I provide the guide ribs 92 which in the embodiment shown take the form of a cross of substantially the diameter of the smaller outer portions 94 of said arms projecting from each side of the valve head 88 into said arms at all times accurately align the valve head 88 so that it may seat against the valve seats 90$^a$ and 90$^b$. In my preferred embodiment I preferably taper each face 98 of the valve head 88 as at 100 towards the center thereof so that the valve head will not move on slight ebullitions through the pipes 79 and 44$^a$ and in order that it may take a substantial amount of pressure to remove the valve head 88 from its respective seats 90$^a$ and 90$^b$. The disc-piston 99 is preferably attached to the lower ribs 92 to increase the positiveness of action of this valve, although it may be dispensed with if desired, particularly if a valve having a relatively larger ratio of valve diameter to valve lift is employed.

In operation, the effluent from the filter bed flows into the effluent line 10, the effluent valve 16 being open. There is no appreciable differential across the wide-open valve 16 and so the valve head 88 rests by its own weight against its lower valve seat 90$^b$ to admit the water pressure through the pipe 44$^a$ through the check valve 76 and the pipe 44$^b$ into the high-pressure compartment 38 as usual. Water pressure is also admitted through the pipe 40 from the low pressure side of the Venturi tube 20 into the lower pressure compartment 36 of the casing 30, thus affecting the position of the diaphragm so as to respectively raise or lower the rod 48 to raise or lower the respective piston-heads 56 and 58 in the pilot-valve to permit water to flow through either of the respective lines 64 or 66 thereof in a well known manner to the upper or lower respective ends 68 or 70 of the hydraulic cylinder 72 to so respectively raise or lower the hydraulic piston 74 so as to open or close the controller valve 18 in accordance with the variations in the rate of flow. The control weights 78 are suitably set on the lever 50 for the desired rate of flow. If when operated in the usual manner it is desired to wash the filter bed, the effluent valve 16 is shut and the wash water valve 26 is opened. Thus when the effluent valve 16 is shut the controller valve 18 is left in an open position. When my invention is attached, however, as the filter bed pressure is admitted to the effluent line 10 upstream of the closed effluent valve 16, it will raise the valve head 88 in the check valve 76 upwards thus permitting water to flow through the line 79 through the check valve 76 and the line 44$^b$ into the upper high pressure compartment 38 thereby depressing the diaphragm 28 and lowering the pistons 56 and 58 of the pilot valve so that water will flow through the inlet 62 thereof through the outlet line 66 thereof to the top 70 of the hydraulic cylinder 62 to push the hydraulic piston 74 down to close the controller valve 18. Then when the wash is over and the effluent valve again opened, insufficiently filtered water will not immediately pass through the wide-open valve 18 to the clear well. Instead, the controller valve 18 will be closed and will open slowly until the proper differential will again be formed in the differential producer 20 which will then act on the differential responsive means 22 to open the valve 18 the proper amount through the medium of the pilot valve 32 and hydraulic piston 34 where employed. The controller valve 18 thus gradually opens to the rate set by the position of the counterweights 78. Though I have shown my improved invention adapted for use in a filtration plant, it is obvious that it may, if desired, be employed as a shut-off valve in a desired type of pipe line.

It is also clear that my invention can be used with other pressure responsive means, such as a filter plant gauge and also that the second source of pressure may be responsive to the clear well level or a master-control instead of the pressure upstream of the effluent valve.

It is understood that my invention is not limited to the specific embodiment shown and that various deviations may be made therefrom without departing from the spirit and scope of the appended claims.

What I claim is:

1. In a filtration apparatus, an effluent line connected to a filtration bed, an effluent valve in said line, a controller valve below the effluent valve for controlling the rate of flow therethrough, a differential producer in said line below said effluent valve, differential responsive means for controlling said valve, a pipe connecting the upstream side of said differential producer with the high-pressure side of said differential responsive means, a weighted double-acting check valve interposed in said pipe and a pipe joining the opposite side of said check valve with the effluent line above said effluent valve, whereby on closing of said effluent valve the pressure of the water upstream of said valve may open said check valve against the force tending to actuate it to admit sufficient pressure to the differential responsive means to close said controller valve so that on reopening of said effluent valve insufficiently filtered water will not pass through the effluent line.

2. In a pipe line, a shut-off valve, a controller valve in said line below the shut-off valve for controlling the rate of flow therethrough, a differential producer in said line below said shut-off valve, a casing, a diaphragm contained within said casing dividing said casing into a high-pressure and a low-pressure compartment, a hydraulic piston for controlling the position of said controller valve, a pilot valve for controlling the position of said piston, means connecting said diaphragm and pilot valve to control the position thereof in response to the position of said diaphragm, a pipe connecting the downstream end of said differential producer with the low-pressure compartment, a pipe connecting the upstream end of said differential producer with the high-pressure compartment, a T-valve interposed in said pipe having one T-arm thereof connected to said upstream end and the T-base thereof connected to said high pressure compartment, said T-arms having a portion of larger diameter opposite said T-base forming valve seats on each edge thereof, a pipe connecting the opposite T-arm thereof to the line above the shut-off valve and a valve head of substantial weight of substantially the diameter of the enlarged portion of said T-arms having guide ribs of substantially the diameter of the smaller outer portions of said T-arms projecting from each side thereof into said T-arms each face of said piston tapering towards the center thereof and a disc piston attached to the lower ends of said lower ribs.

3. In a pipe line, a shut-off valve, a controller valve in said line below the shut-off valve for controlling the rate of flow therethrough, a differential producer in said line below said shut-off valve, a casing, a diaphragm contained within said casing dividing said casing into a high-pressure and a low-pressure compartment, a hydraulic piston for controlling the position of said controller valve, a pilot valve for controlling the position of said piston, means connecting said diaphragm and pilot valve to control the position thereof in response to the position of said diaphragm, a pipe connecting the downstream end of said differential producer with the low-pressure compartment, a pipe connecting the upstream end of said differential producer with the high-pressure compartment, a T-valve interposed in said pipe having one T-arm thereof connected to said upstream end and the T-base thereof connected to said high-pressure compartment, said T-arms having a portion of larger diameter opposite said T-base forming valve seats on each edge thereof, a pipe connecting the opposite T-arm thereof to the line above the shut-off valve and a valve head of substantial weight of substantially the diameter of the enlarged portion of said T-arms having guide ribs of substantially the diameter of the smaller outer portions of said T-arms projecting from each side thereof into said T-arms.

4. In a pipe line, a shut-off valve, a controller valve in said line below the shut-off valve for controlling the rate of flow through said line, a differential producer in said line below said shut-off valve, a casing, a diaphragm contained within said casing dividing said casing into a high-pressure and a low pressure compartment, a hydraulic piston for controlling the position of said controller valve, means connecting said diaphragm and pilot valve to control the position thereof in response to the position of said diaphragm, a pipe connecting the downstream end of said differential producer with the low-pressure compartment, a pipe connecting the upstream end of said differential producer with the high-pressure compartment, a weighted double acting check valve interposed in said pipe and a pipe joining the opposite side of said check valve with the line above said shut-off valve whereby on closing of said shut-off valve, the pressure of the fluid above said shut-off valve may open said check valve to admit sufficient pressure to the casing to close said controller valve.

5. In a filtration apparatus, an effluent line connected to a filtration bed, an effluent valve in said line, a controller valve below the effluent valve for controlling the rate of flow therethrough, a differential producer in said line below said effluent valve, differential responsive means for controlling said valve, a pipe connecting the upstream side of said differential producer with the high pressure side of said differential responsive means, a T-valve interposed in said pipe having one T-arm thereof connected to said upstream end and the T-base thereof connected to said high pressure compartment, said T-arm having a portion of larger diameter opposite said T-base forming valve seats on each edge thereof, a pipe connecting the opposite T-arm thereof to the line above the effluent valve and a valve head of substantially the diameter of the enlarged portion of said T-arms having guide ribs of substantially the diameter of the smaller outer portions of said T-arms projecting from each side thereof into said T-arms.

6. In a pipe line, a shut-off valve, a controller valve below said shut-off valve, a differential producer in said line below said shut-off valve, differential responsive means, a hydraulic piston for controlling said controller valve, a pilot valve for controlling the position of said piston controlled in its action by said differential responsive means, a pipe connecting the upstream side of said differential producer with the high-pressure side of said differential responsive means, a weighted double-acting check valve interposed in said pipe and a pipe joining the opposite sides of said check valve with said line above said shut-off valve.

7. In a pipe line, a shut-off valve, a controller valve below said shut-off valve, a differential producer in said line below said shut-off valve, differential responsive means, a pipe connecting the upstream side of said differential producer with the high-pressure side of said differential responsive means, a double-acting check valve interposed in said pipe and a pipe joining the opposite side of said check valve with said line above said shut-off valve.

In testimony whereof I affix my signature.

JOSEPH KUEN.